(12) United States Patent
Saffour

(10) Patent No.: US 12,150,431 B1
(45) Date of Patent: Nov. 26, 2024

(54) COLLECTION SYSTEM AND METHOD

(71) Applicant: Bayan Saffour, New York, NY (US)

(72) Inventor: Bayan Saffour, New York, NY (US)

( * ) Notice: Subject to any disclaimer, the term of this patent is extended or adjusted under 35 U.S.C. 154(b) by 0 days.

(21) Appl. No.: 18/630,028

(22) Filed: Apr. 9, 2024

(51) Int. Cl.
*A01K 23/00* (2006.01)
(52) U.S. Cl.
CPC .................................. *A01K 23/00* (2013.01)
(58) Field of Classification Search
CPC ..................................................... A01K 23/00
USPC ......................................................... 119/868
See application file for complete search history.

(56) References Cited

U.S. PATENT DOCUMENTS

| | | | | |
|---|---|---|---|---|
| 4,103,645 | A * | 8/1978 | Tyler | A01K 23/00 119/868 |
| 4,156,402 | A * | 5/1979 | Naiztat | A01K 23/00 119/868 |
| 4,269,148 | A * | 5/1981 | Holley-Donawa | A01K 23/00 604/355 |
| 4,353,330 | A * | 10/1982 | Baumgartner | A01K 23/00 119/868 |
| 5,819,691 | A * | 10/1998 | Lavi | A01K 23/00 119/868 |
| 5,937,795 | A * | 8/1999 | Raphael | A01K 23/00 119/869 |
| 6,722,319 | B1 * | 4/2004 | Chiu | A01K 23/00 119/868 |
| 6,941,897 | B1 * | 9/2005 | Rosales | A01K 23/00 119/868 |
| 8,186,311 | B2 * | 5/2012 | Longo | A01K 27/006 59/95 |
| 2007/0199522 | A1 * | 8/2007 | Bosio Blanco | A01K 23/00 119/868 |
| 2007/0227466 | A1 * | 10/2007 | Tsai | A01K 23/00 119/868 |
| 2008/0127909 | A1 * | 6/2008 | Albalas | A01K 23/00 119/868 |
| 2009/0120378 | A1 * | 5/2009 | Dolub | A01K 23/005 119/868 |
| 2011/0126779 | A1 * | 6/2011 | Walls | A01K 23/00 119/868 |
| 2011/0277705 | A1 * | 11/2011 | Hernandez-Ramirez | A01K 23/00 119/868 |
| 2011/0303162 | A1 * | 12/2011 | Morman | A01K 23/00 119/858 |
| 2012/0247402 | A1 * | 10/2012 | Blanco | A01K 23/00 119/868 |
| 2013/0327283 | A1 * | 12/2013 | Hazan | A01K 23/00 119/868 |
| 2014/0238315 | A1 * | 8/2014 | Lee | A01K 23/00 119/868 |
| 2015/0156991 | A1 * | 6/2015 | Dixon | A01K 23/00 119/868 |

(Continued)

*Primary Examiner* — Yvonne R Abbott-Lewis

(57) ABSTRACT

Implemented is an animal feces collection device that includes a wearable housing configured to be worn by an animal and a retainer ring that is removably connected to the wearable housing. The retainer ring includes at least one bag clamp configured to retain a bag and hold the bag in an open position. Upon the animal using the bathroom, and depositing feces within the bag, the wearable housing is configured to disconnect the retainer ring and bag with feces therein such that the retainer ring and bag with feces fall to the ground away from the animal.

18 Claims, 12 Drawing Sheets

(56) References Cited

U.S. PATENT DOCUMENTS

2015/0189859 A1\* 7/2015 John ..................... A01K 23/00
                                                                                                         119/868
2018/0020642 A1\* 1/2018 Nicolas ................. A01K 23/00
                                                                                                         119/868

\* cited by examiner

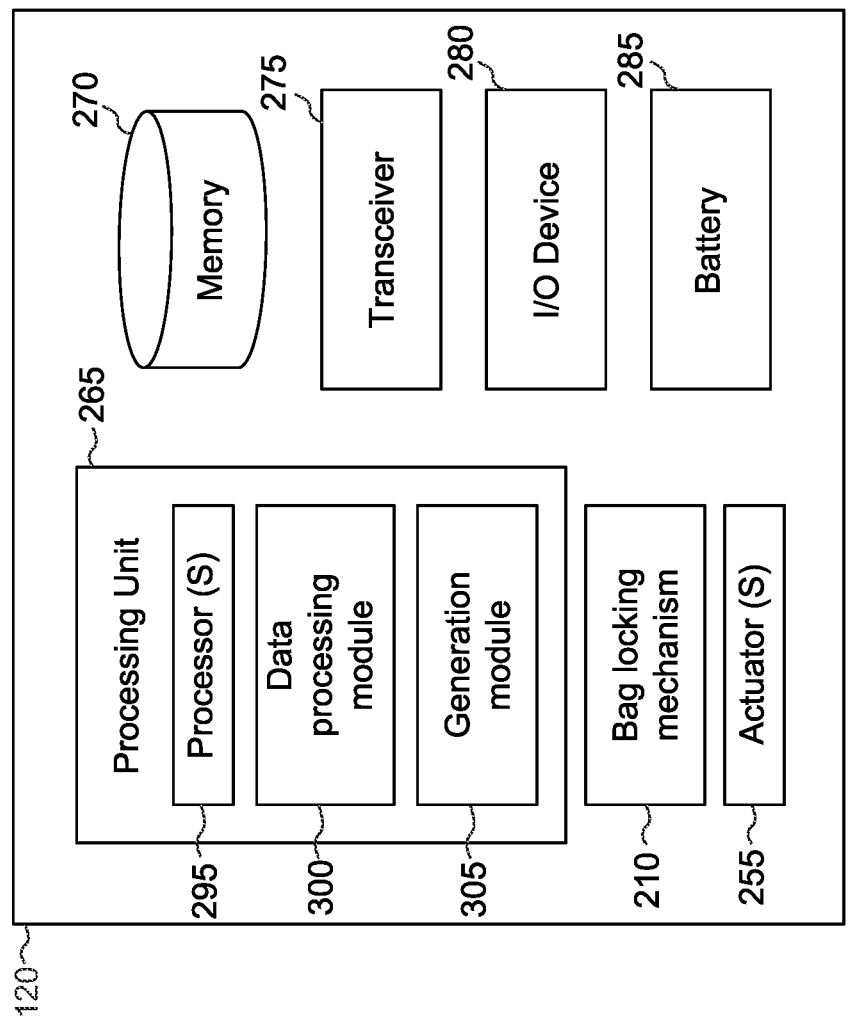
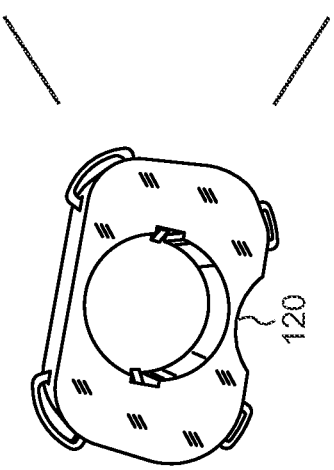
FIG 4A

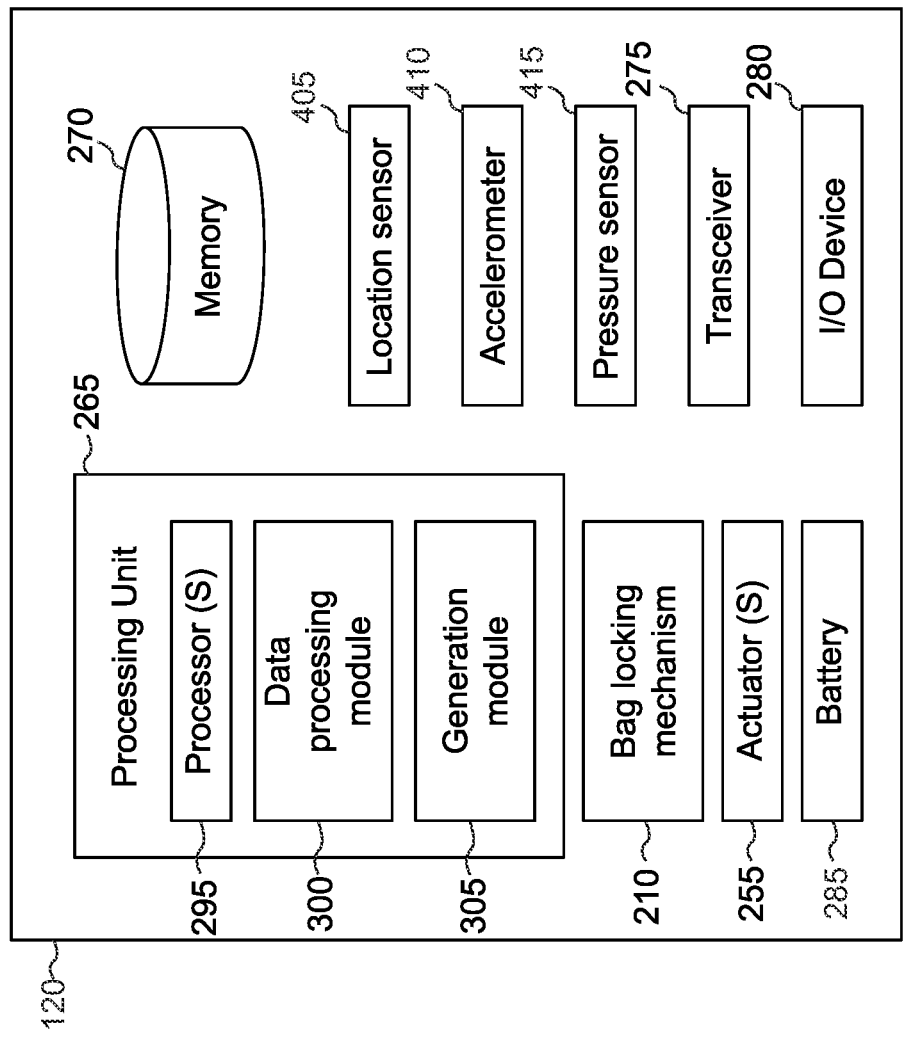
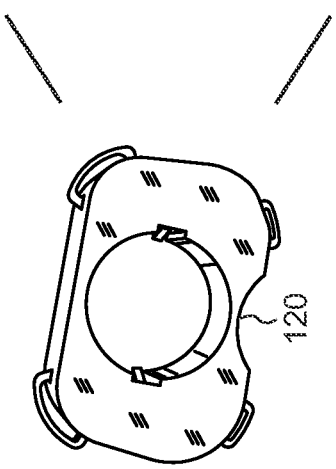
FIG 4B

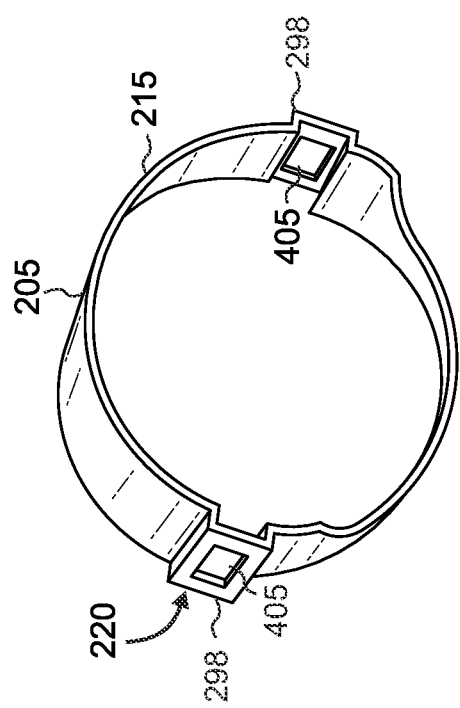

COLLECTION SYSTEM AND METHOD

BACKGROUND

A dog owner wishing to collect the feces of their dog must generally do so by inverting a plastic bag over their hand, grabbing the feces with the plastic bag over their hand, sliding the sides of the plastic bag up and around the feces, tying off the plastic bag, and finally disposing of the bagged feces in a designated trash bin. This process can be difficult, frustrating, and time-consuming for a dog owner. The difficulty of bagging feces is exacerbated for dog owners living in a densely populated metropolitan area, due to the challenge of cleaning their dog's feces off of a busy sidewalk. Additionally, even after picking up the feces, there still remains a feces stain on the sidewalk. Also, it can be difficult to initially open a plastic bag, especially if its windy outside. Furthermore, if the owner's dog has diarrhea, it can be near impossible to pick up the feces using a plastic bag. Unfortunately, sometimes dog owners forget to carry plastic bags, which means the dog owner must use napkins or leave the feces on the ground causing a public health hazard.

SUMMARY

An animal feces collection system is implemented which allows a pet owner to easily manage "potty time" of their pet. The system includes a collection device that is worn by the animal and which automatically collects the animal's feces in a disposable bag. Thus, the feces never contact the ground as the feces are immediately captured by the bag. This eliminates the need for the pet owner to manually pick up the feces from the ground using an inverted disposable bag which covers the pet owner's hand. Upon the direction of the pet owner, the collection device will unlock and drop the disposable bag onto the ground. Thereafter, the pet owner can close the bag of feces and dispose of the bag in a designated garbage bin.

In comparison to known feces collectors, the collection device of the present invention maintains a secure connection of the disposable bag, throughout the bathroom cycle, e.g., before, during, and after the animal defecates into the bag. In other words, the collection device includes a designated retainer ring that securely mounts the disposable bag in an open position such that the bag does not undesirably slip off the collection device or become closed shut when the animal moves. Furthermore, the contour of the body of the collection device helps to maintain the bag in a relatively vertical position so that the bag may receive the feces when the animal assumes its squatting position during defecation.

The animal feces collection system includes a collection device that is worn by the animal generally includes a wearable housing configured to be worn by an animal, the wearable housing includes a body and a hole therein configured to allow animal feces to pass therethrough, and a retainer ring removably connected to the wearable housing. The retainer ring includes at least one bag clamp. The system further includes a disposable bag removably connected to and held open by the retainer ring via the at least one bag clamp. The system further includes a user device in communication with the wearable housing. The user device is configured output a deposit signal to the wearable housing upon receiving a corresponding user command. Upon receiving the deposit signal, the wearable housing is configured to disconnect the retainer ring and bag, with feces therein, which is connected to the retainer ring.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from reading the following Detailed Description and reviewing the associated drawings.

DESCRIPTION OF THE DRAWINGS

FIGS. 4A-B show illustrative schematic representations of the components and computer hardware that operate the receiving device;

FIG. 5 shows an illustrative representation of a retainer ring used with the disposal device;

Like reference numerals indicate like elements in the drawings. Elements are not drawn to scale unless otherwise indicated.

DETAILED DESCRIPTION

An animal feces collection system includes an animal feces collection device 120 that is worn by an animal 130 and which is remotely controllable by a user 105 via their user device 110, such as a dedicated remote control device, a smartphone device, and/or other computing devices, to capture feces within a disposable bag and subsequently deposit the bag filled with feces on the ground at the behest of the user 105. Thereby, the user no longer needs to manually collect feces within a bag, which can be a difficult and unpleasant process. The animal feces collection system may further include a bag housing with additional disposable bags therein, which may be connected to a leash or onto the collection device (not shown).

Figure 1:
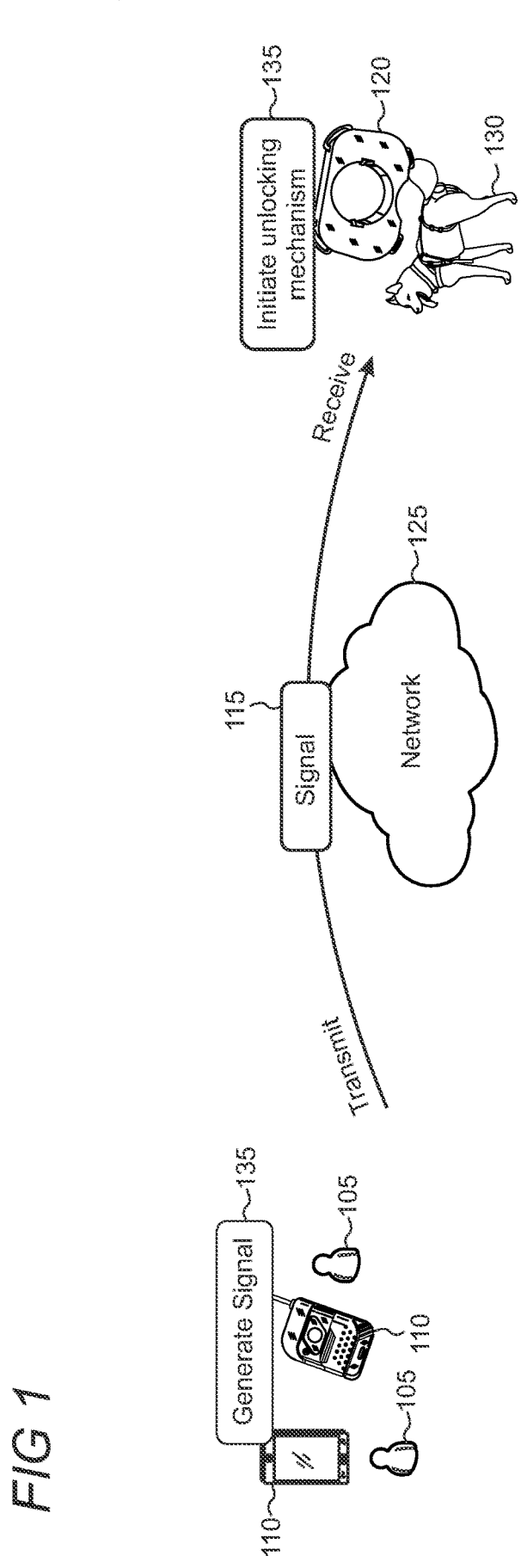
FIG. 1 is an illustrative environment in which a remote control user device controls the operations of a collection device worn by an animal.

FIG. 1 shows an illustrative representation in which the remote control user device 110 generates a signal responsive to user input and that signal is transmitted over a network 125 to the collection device 120. The network may include any one or more of a personal area network, local area network, wide area network, the Internet, etc. Upon receiving the signal, the collection device initiates an unlocking mechanism 135 which releases the bag onto the floor for human pickup. This process, functionality, and relevant components are described in further detail below.

Figure 2A:
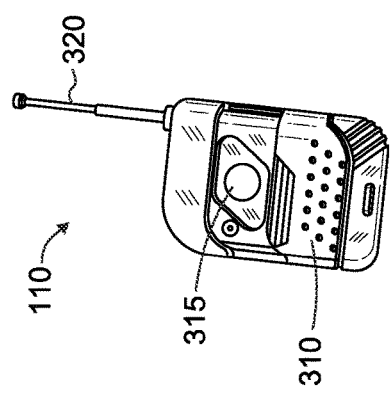
FIG. 2A shows an illustrative representation of a remote control user device that controls a collection device.
Figure 2B:
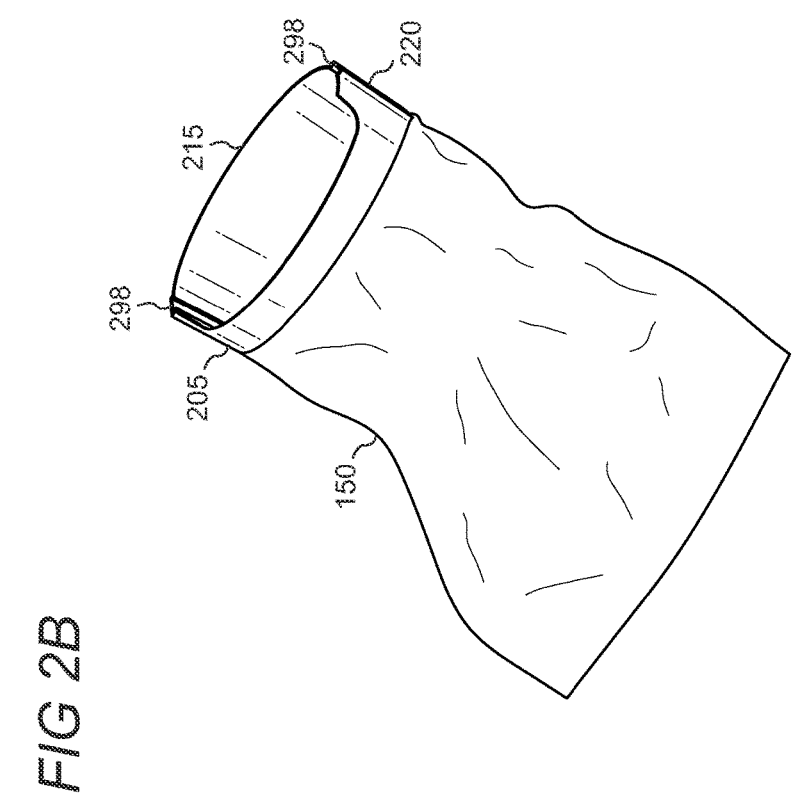
FIG. 2B shows an illustrative representation of a receiving device.
Figure 2C:
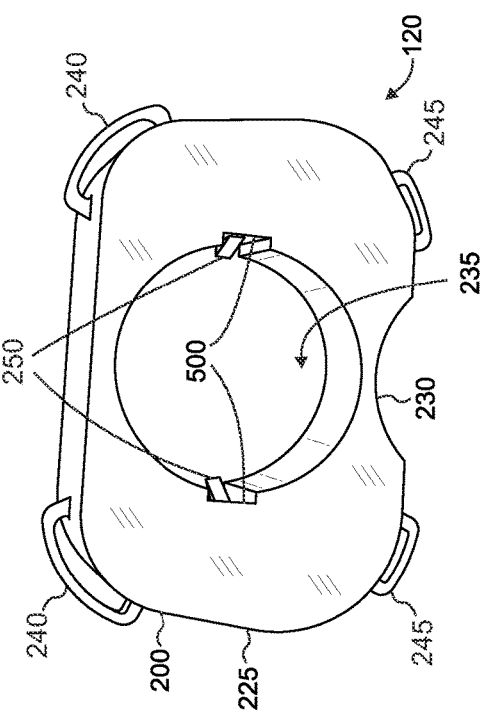
FIG. 2C shows an illustrative representation of a disposal device.

FIGS. 2A-C show illustrative representations of the various devices used in the present system, namely, a remote control user device 105, waste bag 150 attached to a retainer ring 205, and collection device 120, respectively. The remote control user device 105, shown in FIG. 2A, generally includes a housing 310, a button 315 or other user input device, and an antenna 320 to help relay generated signals (FIG. 1) to the collection device 120. The button 315 can be used to turn on/off the wearable housing 200 and send the deposit signal to the processing unit 265 accordingly unlock and drop the retainer ring 205 and bag 150 with feces therein.

The remote control user device's components are discussed in greater detail below. The retainer ring 205 and disposable bag 150, shown together in FIG. 2B, is used to attach to the collection device 120. The retainer ring includes a ring body 215 and lateral protrusions 220 on opposing sides of the ring body 215.

Generally, the collection device, shown in FIG. 2C, comprises a multipurpose wearable housing 200, which is strapped onto the animal at its rear end, and a retainer ring 205 that removably connects to the wearable housing 200 via a locking mechanism 210 housed within the wearable housing 200. Thus, the retainer ring, shown separated in FIG. 2B, attaches to the collection device 120 when the device is assembled.

By way of a nonlimiting example only, the animal feces collection system can be used by an owner 105 of a dog 130. Therein, the user 105 may initially connect the bag 150 to the retainer ring 205, fitting the mouth of the bag 150 around the outer periphery of the ring body 215. In some embodiments, the bag 150 can be held in place on the retainer ring 205 via frictional forces. In an alternative embodiment, the retainer ring 205 can include one or more attachment features, such as bag clamps, for clamping onto and holding the bag 150.

Figure 3:
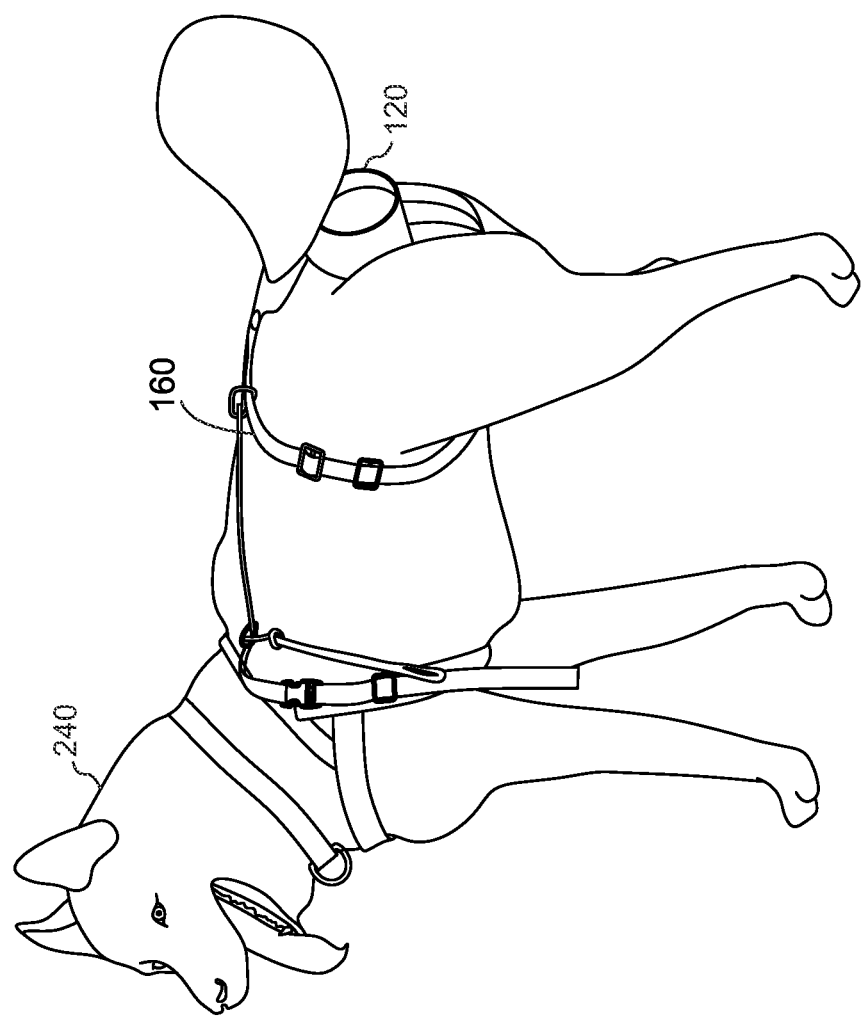
FIG. 3 shows an illustrative representation of the feces receiving device worn by a canine.

Thereafter, the retainer ring 205 can be inserted into and automatically held by the wearable housing 200. The user 105 may then strap the assembled collection device 120 onto their dog 130, underneath its tail, via straps and/or a harness 160, as shown in FIG. 3. After the dog 130 has used the bathroom and deposited the feces directly within the bag 150 (as the feces will pass directly through the hole 235 of the wearable housing 200 and through the retainer ring 205), the user 105 can input a deposit command into the user device 110, which in turn will generate a signal and transmit the signal 115 to the collection device 120 (FIG. 1).

Figure 7:
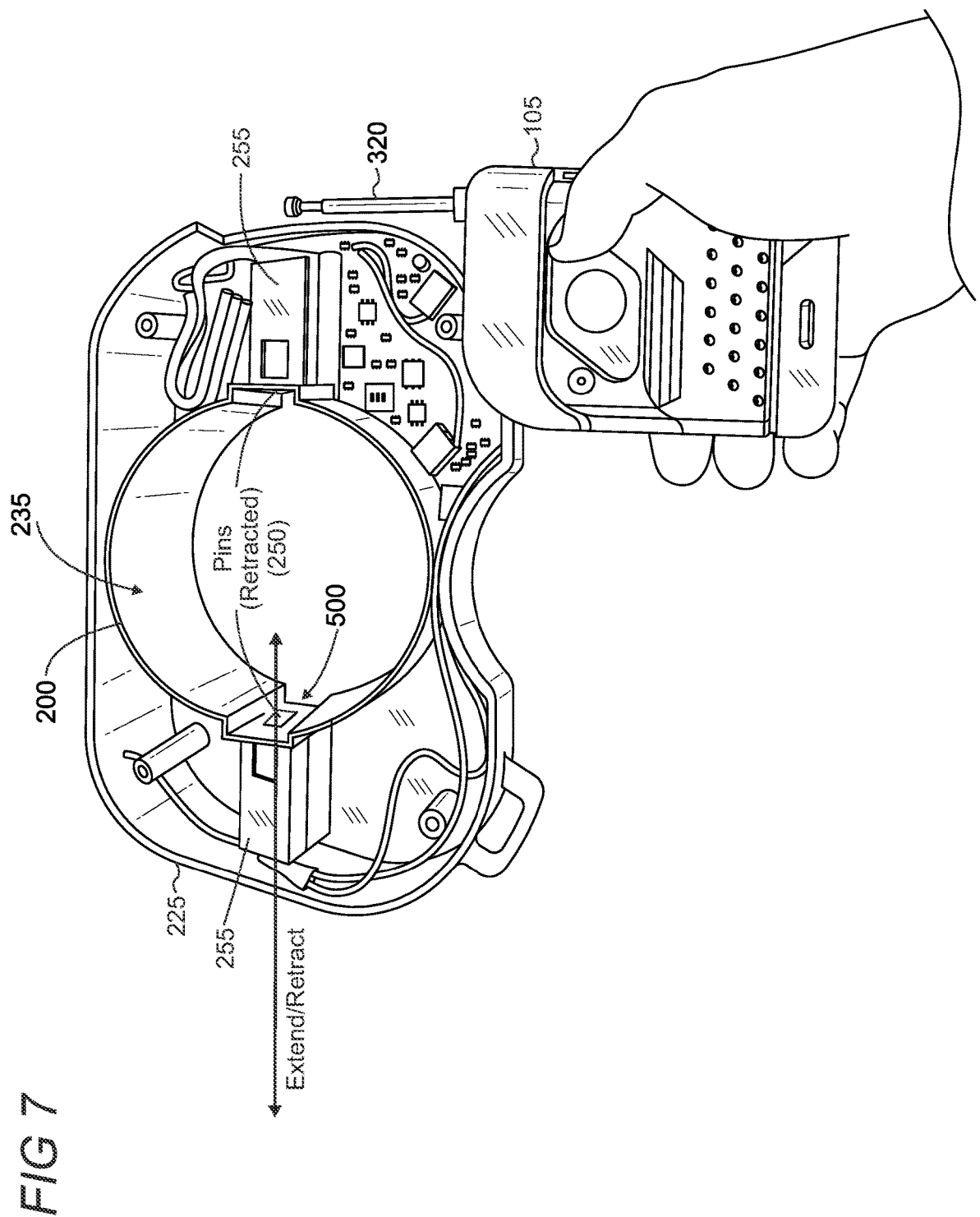
FIG. 7 shows an illustrative representation of the receiving device when its locking mechanism is in an unlocked position and thereby releases the retainer ring and disposal device.

It is noted that, in typical implementations, the retainer ring 205, and the bag 150 with feces therein, will not disconnect from the wearable housing 200 due to the weight of the feces, but only upon the deposit command being inputted by the user 105 (FIG. 7). Upon receiving the deposit signal 115, the collection device 120 will initiate the unlocking procedure to actuate the locking mechanism 210, which will unlock the retainer ring 205 from the wearable housing 200, allowing the retainer ring 205 and the bag 150 affixed thereto to fall down onto the ground due to gravity, as discussed in greater detail below. Hence, the user 105 need only walk over to the deposited bag 150 of feces, tie or otherwise seal the bag 150, and place the bag 150 in a garbage bin. In one embodiment, the user 105 may visually inspect the bag 150 and deposit the retainer ring 205 and bag 150 of feces connected thereto at their behest.

As can be appreciated, the collection device 120 makes "potty time" tremendously easier for a dog owner, especially if the owner's dog 130 has loose stool or diarrhea. The collection device 120 can be used inside of buildings, such as dwellings, grocery stores, etc., or in public places, such as whilst on a walk in the park or on a sidewalk.

Figure 9:
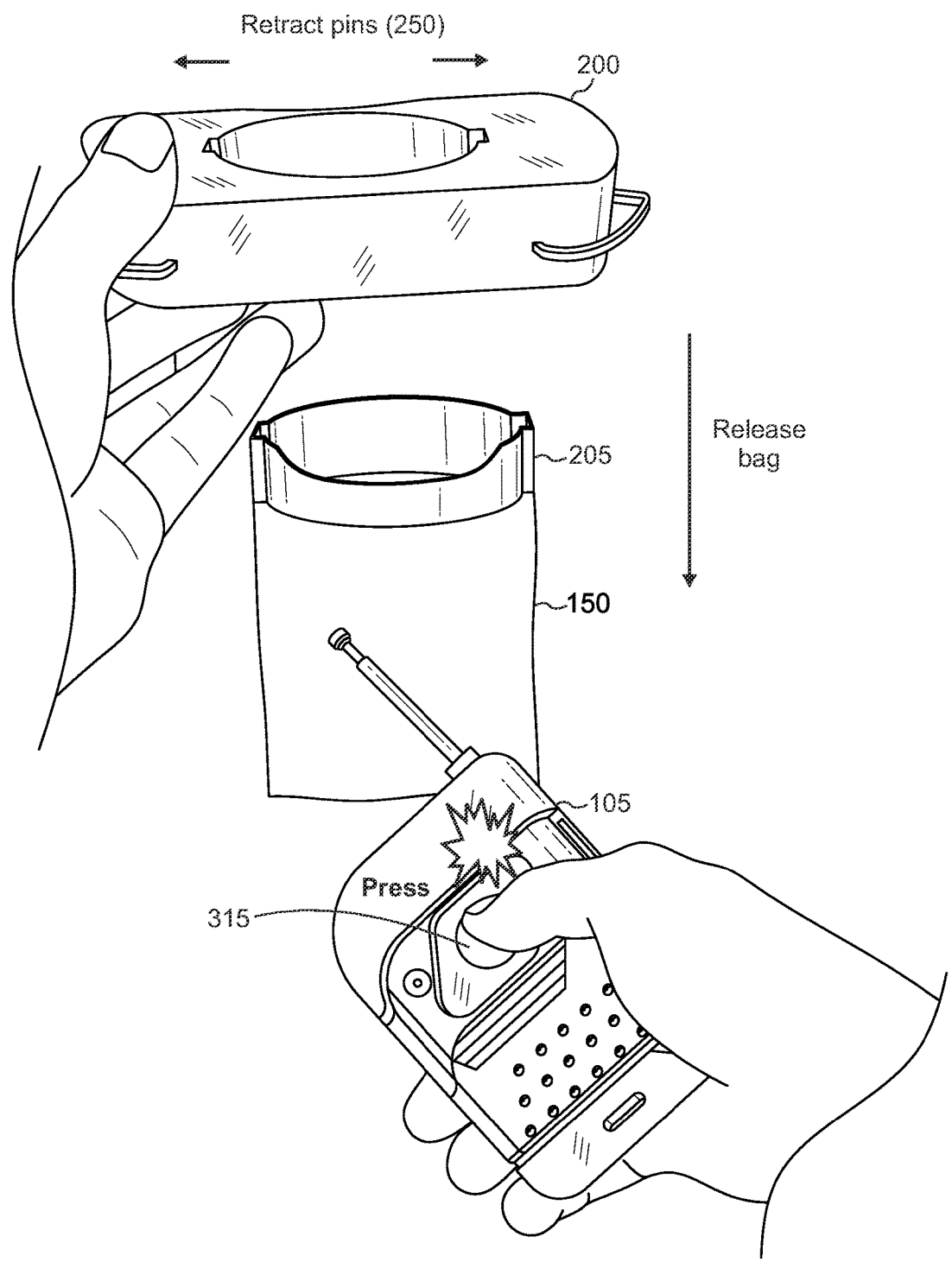
FIG. 9 shows an illustrative representation of the disposal device detaching from the receiving device and thereby falling to the ground.

In more detail, referring to FIG. 2C, the wearable housing 200 has a contoured body 225 with a tail cutout 230 for accommodating a tail of an animal and a through hole 235 in the body 225 for allowing the feces to pass therethrough, and more particularly, through the retainer ring 205 fitted within the hole 235 and subsequently into the bag 150. The wearable housing 200 also includes one or more strap attachment points 240, 245, e.g., four strap mounts integrally formed with the body 225, for mounting the straps 160 which connect the wearable housing 200 onto the animal. Two of the strap attachment points 240 can be located at the top of the body 225, flanking the tail cutout 230, and the other two strap attachment points 245 can be located at bottom, rounded corners of the body 225. The upper strap attachment points 240 accommodate the tail of the animal while maintaining the correct height of the wearable housing 200 in order to substantially coaxially align the animal's anus with the hole 235 of the wearable housing 200. The lower strap attachment points 245 accommodate the legs of the animal to allow the straps to pass over the thighs of the animal on the outside thereof and/or in between the thighs on the inside thereof. Furthermore, the body 225 of the wearable housing 200 is tapered such that the body 225 is thinnest at its top end and widest at its bottom end (FIG. 9). The contoured and tapered body 225 serves to correctly orient the bag 150, in a generally vertical position, when a dog 130 squats to defecate. Thereby, the body 225 of the wearable housing 200 ergonomically fits the shape of the animal and it assists in ensuring that any feces defecated by the animal fall into an open, uncrumpled or uncreased bag 150.

The body 225 of the wearable housing 200 may comprise a multipart body. For example, the body 225 may comprise a two-part body which mate with one another via mating features, such as protrusions and corresponding detents, clasps, fasteners, etc. The body 225 may comprise any desired material such as plastic. The body 225 of the wearable housing 200 also serves as a housing for the various internal components of the collection device.

FIG. 4 shows an illustrative schematic representation of the collection device's various components. For example, the collection device 120 includes a processing unit 265, memory 270, a transceiver 275, an I/O device 280, such as one or more indicator lights or display screen, a rechargeable battery 285 with an accompanying charging port 290 (not shown in FIG. 4).

The processing unit 265 is operably connected to the actuator(s) 255, I/O device 280, and the battery 285 via the wiring. The processing unit 265 is also operably connected to the user device(s) 110 via the network 125. The network 125 can be any type of communications network, such as a local area network (LAN), wide area network (WAN), a public network such as the internet, and/or any other radio wave communications network and/or some combination thereof. Communication between the processing unit 265 and the user device 110 may occur via any desired network interface using any type of wireless connection. For example, the user device 110 can use a radio frequency of 433 MHz to communicate with the processing unit 265. Furthermore, the network 125 may use a variety of communication protocols (for example UDP, TCP/IP, HTTP, S1vITP, FTP), encodings or formats (for example HTML, JSON, XML), or protection schemes (for example VPN, secure HTTP, SSL).

The memory 270 of the processing unit 265 can be in the form of any desired non-transitory memory. The processing unit 265 of the controller generally includes one or more processors 295 for executing computer-readable instructions. The one or more processors 295 may perform the various functions of the processing unit 265 described herein. The processing unit 265 may further include a data processing module 300 and a generation module 305 for generating the output signals to the actuators 255 and the I/O processing unit 265. The transceiver 275 can be in the form of any desired device to establish communication between the processing unit 265 and the remote user device 110. In an alternative embodiment, the transceiver 265 may be configured as a receiver for simply receiving the input commands from the user device 110.

FIG. 4B shows an illustrative representation in which an alternative embodiment of the feces collection device and overall system can be implemented. The feces collection device 1100 may automatically deposit the retainer ring 205 and bag 150 with feces therein, without user intervention. Thereby, the collection system may or may not include a user device 110. In such a configuration, the wearable housing 200 may further comprise one or more sensors for determining when and/or where the animal has defecated and/or if the bag 150 has received feces therein.

For example, the one or more sensors may include a location sensor 405, an accelerometer 410, a pressure sensor 415, and/or an optical sensor. The sensed data of the one or more sensors 405, 410, 415, can be stored in the memory 270 and the data processing module 300 can process the data to determine when and/or where the animal is presently defecating; and thereafter, the generation module 305 may generate and output the deposit signal 115 which is provided to the locking mechanism 210 in order to automatically drop the retainer ring 205 and the bag 150 of feces.

The wearable housing 200 can include a location sensor 1105, an accelerometer 1110, and a pressure sensor 1115. In use, the location sensor 1105 may detect a present location of the animal. The accelerometer 1110 can detect when the animal has assumed the squatting position for defecating. The pressure sensor 1115 can sense when feces have been deposited within the bag 150. For example, one or more pressure sensors 1115 can be respectively connected to the locking pins 250 and accordingly sense when additional weight, i.e., the weight of the feces, has been added onto the locking pins 250 as applied by the retainer ring 205. Once feces have been detected in the bag 150, the processing unit 265 may automatically deposit the retainer ring 205 and bag 150 of feces and/or notify the user 105 via outputting a ready signal to the user device 110. Thereafter, after the retainer ring 205 and bag 150 are deposited, the user 105 may accordingly pick up the bag 150, remove the ring from the bag 150, tie or otherwise seal the bag 150, and place the bag 150 of feces within a garbage bin.

Figure 6:
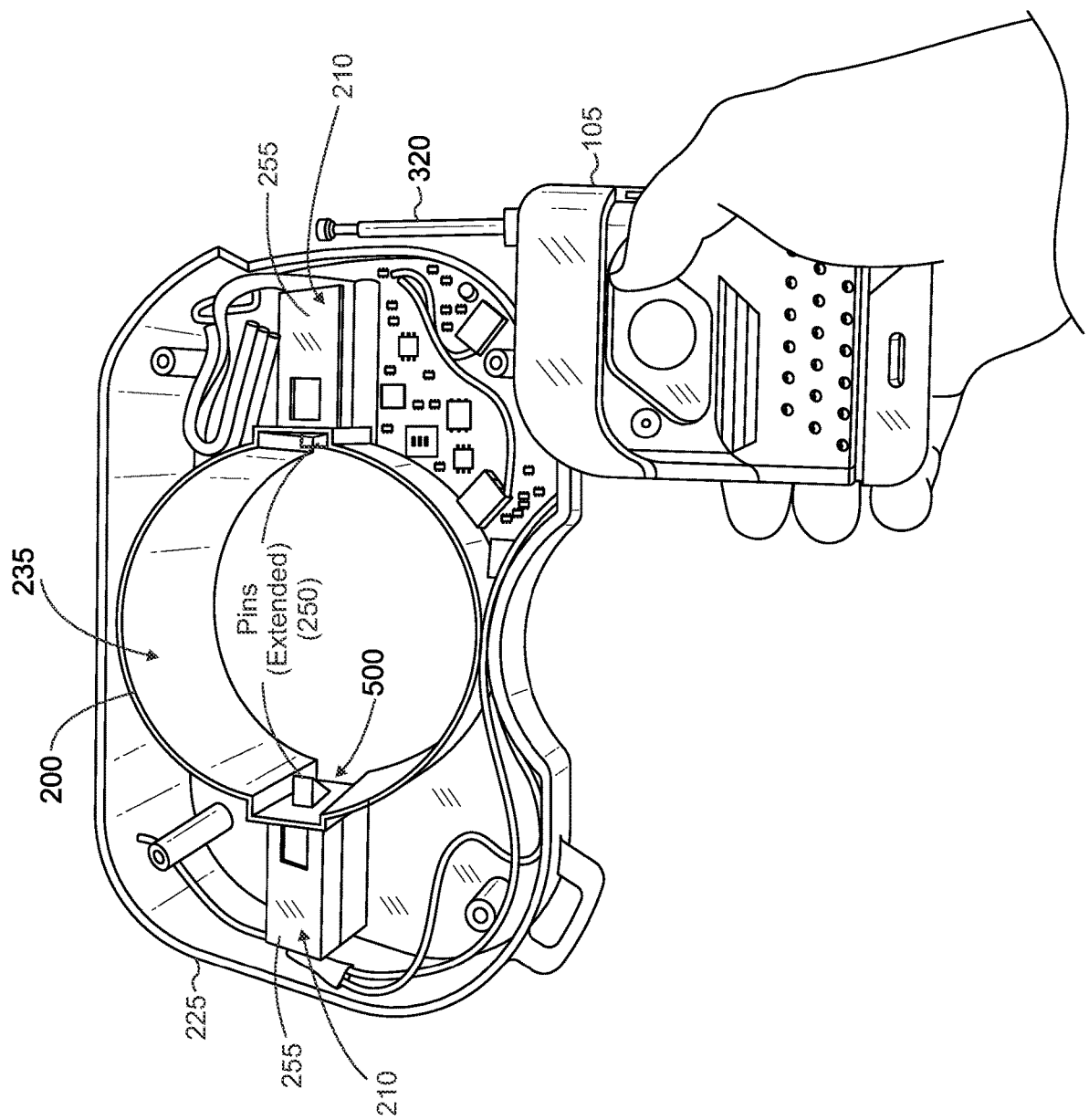
FIG. 6 shows an illustrative representation of the receiving device when its locking mechanism is in a locked position.

FIG. 5 shows an illustrative representation of the retainer ring 205 and ring body 215 from an alternative angle, and FIGS. 6 and 7 show illustrative representations of the collection device with its cover removed to further show its various components. FIGS. 5-7 are discussed in relation to each other. The user 105 can align the pair of lateral protrusions 220 (outwardly extending sections) on the retainer ring 205 with the channels 500 in the hole 235 of the body 225 of the wearable housing 200. Thereafter, the user 105 can push the retainer ring 205 into the hole 235 until the retainer ring 205 locks within the wearable housing 200 in a locked position, as shown in FIG. 7. As the retainer ring 205 is slid upwardly, the outer periphery of the retainer ring 205 can contact the tapered ends of the pins 250 and either slide relative thereto and/or slightly depress the pins 250. In the locked position, the tapered ends of the pins 250 extend into respective pin holes 405 in the lateral protrusions 220 of the retainer ring 205.

The locking mechanism 210 of the wearable housing 200 is comprised of one or more articulating pins 250 that are movable by respective linear actuators 255. Referring specifically to FIGS. 6 and 7, each pin 250 of the locking mechanism 210 can be located in a corresponding channel or recess 500 in the hole 235 of the body 225 of the wearable housing 200. Each pin 250 can have a tapered end which generally forms an upside down triangle. Each tapered end of each pin 250 defines an angled surface and a top ledge. During assembly, the pins 250 allow the retainer ring 205 to fit within the hole 235 akin to a one-way locking mechanism. For example, the user 105 can align the pair of lateral protrusions 220 (outwardly extending sections) on the retainer ring 205 with the channels 500 in the hole 235 of the body 225 of the wearable housing 200. Thereafter, the user 105 can push the retainer ring 205 into the hole 235 until the retainer ring 205 locks within the wearable housing 200 in a locked position, as shown in FIG. 6.

As the retainer ring 205 is slid upwardly, the outer periphery of the retainer ring 205 can contact the tapered ends of the pins 250 and either slide relative thereto and/or slightly depress the pins 250. In the locked position, the tapered ends of the pins 250 extend into respective pin holes 405 in the lateral protrusions 220 of the retainer ring 205. The tops of the tapered ends of the pins 250 respectively mate against the inside, downward-facing surfaces of the pin holes 405 of the retainer ring 205. Hence, unless and until the pins 250 are actuated by the actuators 255, the retainer ring 205 rests atop the ledges of the tapered ends of the pins 250. The bag 150 can be held in position via frictional forces upon being pinched in between the outer periphery of the retainer ring 205 and the inner periphery of the hole 235 of the body 225 of the wearable housing 200 and/or via the pins 250 which may lock respective portions of the bag 150 within the pin holes 405 of the retainer ring 205.

Each actuator 255 can comprise a linear servo motor that translates the pins 250 back and forth. Each actuator 255 can be fitted within an actuator recess within the body 225 of the wearable housing 200. Each actuator 255 is operably connected to the processing unit 265 and the battery 285.

Figure 8:
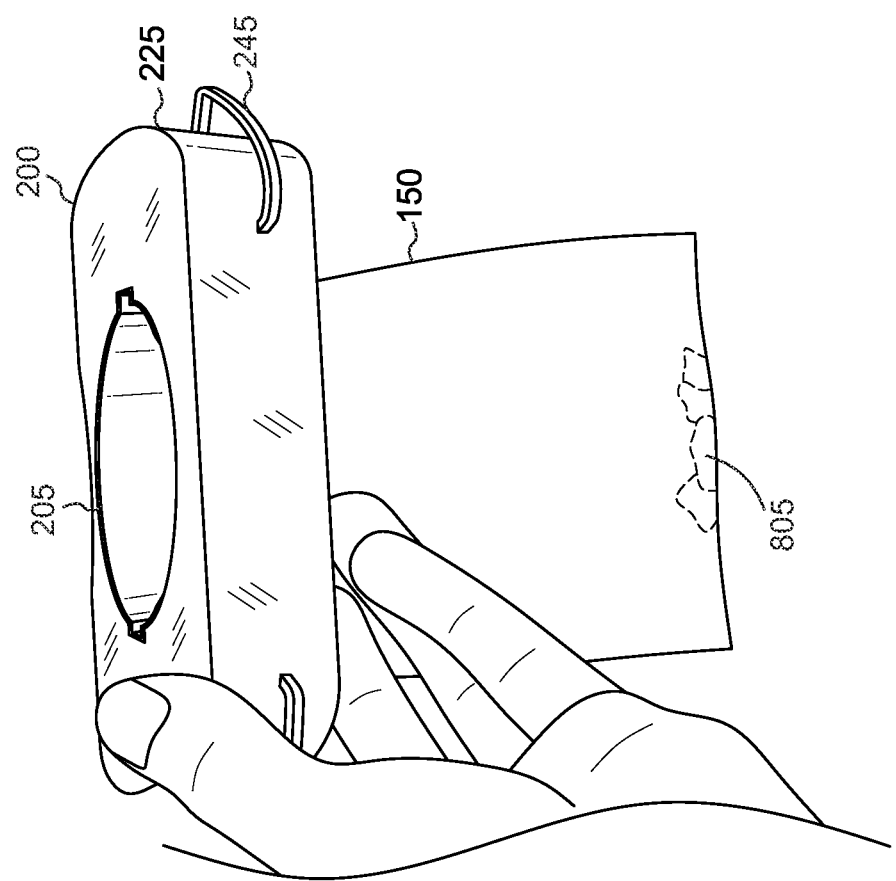
FIG. 8 shows an illustrative representation of the disposal and receiver devices in an assembled position and animal droppings are in the bag.

FIGS. 8 and 9 show illustrative representations in which the collection device is remotely controlled by a user. As shown, droppings 805 may be caught by the bag 150 when a pet goes to the bathroom. The bag is attached to the retainer ring 205 which is in turn attached to the collection device's housing 200. Once the user recognizes that their pet is finished, he or she may press the button 315 which transmits a signal to the collection device 120, retracts the pins 250, and thereby causes the retaining ring 205 to drop along with the bag 150. The pins may be retracted for a pre-set period of time, such as, for example, 10 seconds, one minute, etc.

Figure 10:
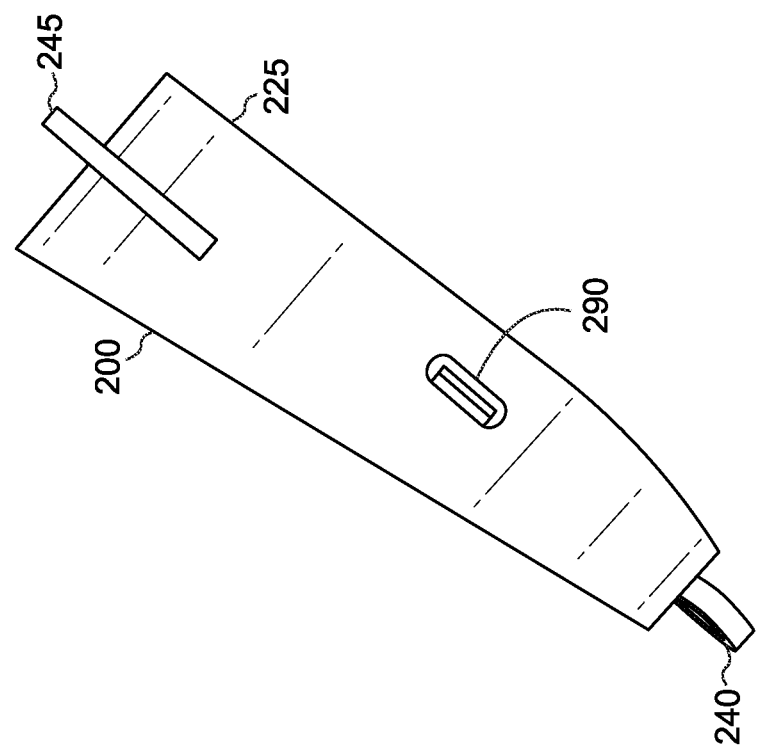
FIG. 10 shows an illustrative representation of a charging port on the receiving device.

FIG. 10 shows an illustrative representation in which the collection device 120 includes a port 290 for charging the device. The port may be, for example, a USB (universal serial bus), micro-USB, etc. that can receive a charge via some electrical contacts with a wired connector. The port may be connected to the battery 285, as described above with respect to FIGS. 4A-B.

Figure 11:
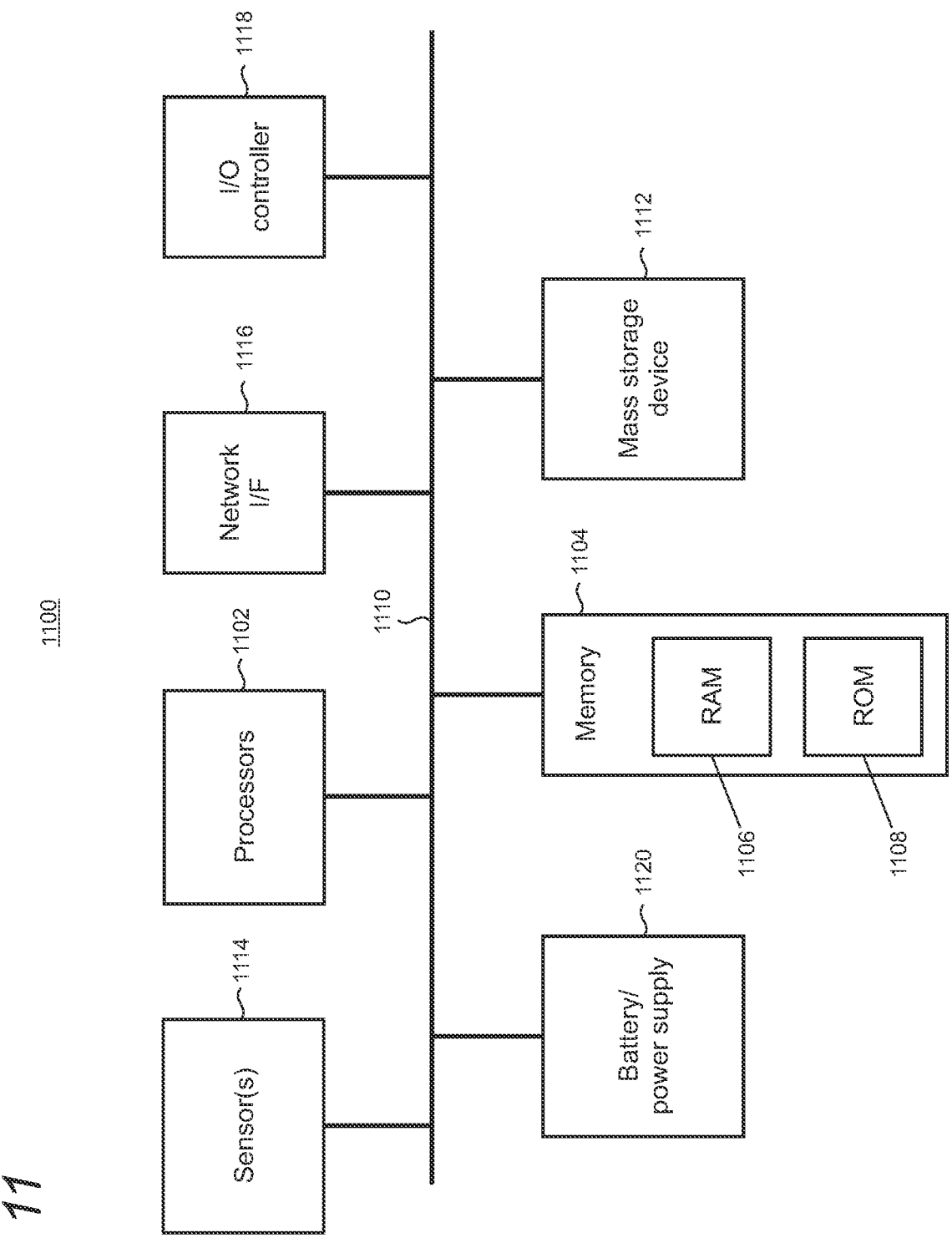
FIG. 11 is a simplified block diagram of an illustrative architecture of a computing device that may be used at least in part to implement the present collection system and method.

FIG. 11 shows an illustrative computer system, such as the remote control user device 105, a smartphone device, or the collection device that may be utilized to perform the operations herein. The architecture 1100 illustrated in FIG. 11 includes one or more processors 1102 (e.g., central processing unit, dedicated Artificial Intelligence chip, graphics processing unit, etc.), a system memory 1104, including RAM (random access memory) 1106 and ROM (read-only memory) 1108, and a system bus 1110 that operatively and functionally couples the components in the architecture 1100. A basic input/output system containing the basic routines that help to transfer information between elements within the architecture 1100, such as during startup, is typically stored in the ROM 1108. The architecture 1100 further includes a mass storage device 1112 for storing software code or other computer-executed code that is utilized to implement applications, the file system, and the operating system. The mass storage device 1112 is connected to the processor 1102 through a mass storage controller (not shown) connected to the bus 1110. The mass storage device 1112 and its associated computer-readable storage media provide non-volatile storage for the architecture 1100. Although the description of computer-readable storage media contained herein refers to a mass storage device, such as a hard disk or CD-ROM drive, it may be appreciated by those skilled in the art that computer-readable storage media can be any available storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVD, HD-DVD (High Definition DVD), Blu-ray, or other optical storage, a magnetic cassette, magnetic tape, magnetic disk storage or other magnetic storage device, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It may be appreciated that the network interface unit 1116 also may be utilized to connect to other types of networks and remote computer systems. The architecture 1100 also may include an input/output controller 1118 for receiving and processing input from a number of other devices, including a keyboard, mouse, touchpad, touchscreen, control devices such as buttons and switches, or electronic stylus (not shown in FIG. 11). Similarly, the input/output controller 1118 may provide output to a display screen, user interface, a printer, or other output device types (also not shown in FIG. 11).

It may be appreciated that the software components described herein may, when loaded into the processor 1102 and executed, transform the processor 1102 and the overall architecture 1100 from a general-purpose computing system into a special-purpose computing system customized to facilitate the functionality presented herein. The processor 1102 may be constructed from any number of transistors or other discrete circuit elements, which may individually or collectively assume any number of states. More specifically, the processor 1102 may operate as a finite-state machine in response to executable instructions contained within the software modules disclosed herein. These computer-executable instructions may transform the processor 1102 by specifying how the processor 1102 transitions between states, thereby transforming the transistors or other discrete hardware elements constituting the processor 1102.

Encoding the software modules presented herein also may transform the physical structure of the computer-readable storage media presented herein. The specific transformation of physical structure may depend on various factors in different implementations of this description. Examples of such factors may include but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1100 may further include one or more sensors 1114 or a battery or power supply 1120. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1100 in order to store and execute the software components presented herein. It also may be appreciated that the architecture 1100 may include other types of computing devices, including wearable devices, handheld computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Various exemplary embodiments are disclosed herein. One exemplary embodiment includes an animal feces collection device, comprising: a wearable housing configured to be worn by an animal, the wearable housing comprising a body and a hole therein configured to allow feces to pass therethrough; and a retainer ring removably connected to the wearable housing, the retainer ring comprising at least one bag clamp configured to retain a bag and hold the bag in an open position. Upon the animal using the bathroom, and depositing feces within the bag, the wearable housing is configured to disconnect the retainer ring and bag with feces therein such that the retainer ring and bag with feces therein fall to the ground away from the animal.

In a further example, after being disconnected from the wearable housing, the retainer ring is configured to retain and hold the bag in its open position, allowing the user to pick up the retainer ring and bag with feces therein from the ground, remove the bag from the retainer ring, close the bag, and deposit the bag in a garbage bin. As another example, the bag is securely attached to the retainer ring before and after the animal has defecated into the bag. As another example, the retainer ring is fitted within the hole of the wearable housing. As another example, the wearable housing further comprises a pair of locating channels that extend into an inner periphery of the hole in the body; and the retainer ring comprises a pair of lateral side protrusions that fit within the channels of the wearable housing to accordingly locate and orient the retainer ring when assembled to the wearable housing. As another example, the wearable housing further comprises at least one locking mechanism configured to selectively lock onto the retainer ring to hold the retainer ring in the wearable housing. As another example, the locking mechanism comprises; at least one locking pin located at an inner periphery of the hole; and at least one actuator configured to move the at least one locking pin into and out of the hole such that the at least one locking pin selectively contacts and locks the retainer ring within the hole of the wearable housing. As another example, the locking mechanism comprises a pair of locking pins and a pair of actuators respectively connected to the locking pins. As another example, the wearable housing further comprises a controller configured to receive a deposit signal from a user device and accordingly actuate the at least one actuator to unlock the retainer ring from the wearable housing. As another example, the retainer ring comprises a ring body and at least one pin hole in the ring body which receives the at least one locking pin upon actuation of the at least one actuator. As another example, the at least one locking pin has a tapered end that acts as a ledge upon which the retainer ring rests when assembled to the wearable housing to mechanically lock the retainer ring within the wearable housing. As another example, the body of the wearable housing is tapered so that the bag 150 remains substantially vertical when the animal squats to defecate.

Another exemplary embodiment includes an animal feces collection system, comprising: a wearable housing configured to be worn by an animal, the wearable housing comprising a body and a hole therein configured to allow animal feces to pass therethrough; a retainer ring removably connected to the wearable housing, the retainer ring comprising at least one bag clamp; a bag removably connected to and held open by the retainer ring via the at least one bag clamp; and a user device in communication with the wearable housing, the user device configured output a deposit signal to the wearable housing upon receiving a corresponding user command. Upon receiving the deposit signal, the wearable housing is configured to disconnect the retainer ring and bag, with feces therein, which is connected to the retainer ring.

In a further example, the user device comprises a remote controller that has a button which when depressed by the user causes the remote controller to send the deposit signal to the wearable housing. As another example, after being disconnected from the wearable housing, the retainer ring is configured to retain and hold the bag in its open position, allowing the user to pick up the retainer ring and bag with feces therein from the ground, remove the bag from the retainer ring, close the bag, and deposit the bag in a garbage bin. As another example, the wearable housing further comprises a pair of locating channels that extend into an inner periphery of the hole in the body; the retainer ring fits within the hole of the wearable housing; and the retainer ring comprises a pair of lateral side protrusions that fit within the channels of the wearable housing to accordingly locate and orient the retainer ring when assembled to the wearable housing. As another example, the wearable housing further comprises at least one locking mechanism configured to selectively lock onto the retainer ring to hold the retainer ring onto the wearable housing. As another example, the locking mechanism comprises: at least one locking pin located at an inner periphery of the hole; and at least one actuator configured to move the at least one locking pin into and out of the hole such that the at least one locking pin selectively contacts and locks the retainer ring within the hole of the wearable housing. As another example, the wearable housing further comprises a controller configured to receive the deposit signal from the user device and accordingly actuate the at least one actuator to unlock the retainer ring from the wearable housing.

Another exemplary embodiment includes a method for collecting feces of an animal before the feces are deposited on the ground, the method comprising: providing an animal feces collection system comprising a wearable housing configured to be worn by an animal, the wearable housing comprising a body, a hole therein configured to allow animal feces to pass therethrough, and at least one locking mechanism, a retainer ring removably connected to the wearable housing, the retainer ring comprising at least one bag clamp, a bag configured to collect feces therein, and a user device in communication with the wearable housing; attaching the bag to the retainer ring by fitting a mouth of the bag around the retainer ring; clamping onto the bag by the at least one bag clamp of the retainer ring; inserting the retainer ring, and bag attached thereto, into the hole of the wearable housing; locking the retainer ring within the hole of the wearable housing by the at least one locking mechanism; attaching the wearable housing to the animal; upon the animal defecating into the bag, inputting a user command into the user device; sending, by the user device, a deposit signal to the wearable housing; and upon receiving the deposit signal, actuating the at least one locking mechanism to unlock the retainer ring, thus allowing the retainer ring, and bag with feces therein that is connected to retainer ring, to fall out of the ring holder and onto the ground. The steps of the method may be performed in any desired sequence. The method may omit one or more steps described herein. Further, the method may include additional steps not described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An animal feces collection device comprising:
    a wearable housing configured to be worn by an animal, the wearable housing comprising a body and a hole therein configured to allow feces to pass therethrough; and
    a retainer ring removably connected to the wearable housing, the retainer ring comprising at least one bag clamp configured to retain a bag and hold the bag in an open position;
    at least one locking mechanism configured to selectively lock onto the retainer ring to hold the retainer ring in the wearable housing;
    at least one locking pin located at an inner periphery of the hole; and
    at least one actuator configured to move the at least one locking pin into and out of the hole such that at least one locking pin selectively contacts and locks the retainer ring within the hole of the wearable housing,
    wherein upon the animal depositing feces within the bag, the wearable housing is configured to disconnect the retainer ring and bag with feces therein such that the retainer ring and bag with feces fall to the ground away from the animal.

2. The device of claim 1, wherein after being disconnected from the wearable housing, the retainer ring is configured to retain and hold the bag in its open position, allowing the user to pick up the retainer ring and bag with feces therein from the ground, remove the bag from the retainer ring, close the bag, and deposit the bag in a garbage bin.

3. The device of claim 1, wherein the bag is securely attached to the retainer ring before and after the animal has defecated into the bag.

4. The device of claim 1, wherein the retainer ring is fitted within the hole of the wearable housing.

5. The device of claim 4, wherein:
    the wearable housing further comprises a pair of locating channels that extend into an inner periphery of the hole in the body; and
    the retainer ring comprises a pair of lateral side protrusions that fit within the channels of the wearable housing to accordingly locate and orient the retainer ring when assembled to the wearable housing.

6. The device of claim 1, wherein the locking mechanism comprises a pair of locking pins and a pair of actuators respectively connected to the locking pins.

7. The device of claim 1, wherein the wearable housing further comprises a controller configured to receive a deposit signal from a user device and accordingly actuate the at least one actuator to unlock the retainer ring from the wearable housing.

8. The device of claim 1, wherein the retainer ring comprises a ring body and at least one pin hole in the ring body which receives the at least one locking pin upon actuation of the at least one actuator.

9. The device of claim 8, wherein the at least one locking pin has a tapered end that acts as a ledge upon which the retainer ring rests when assembled to the wearable housing to mechanically lock the retainer ring within the wearable housing.

10. The device of claim 1, wherein the body of the wearable housing is tapered so that the bag remains substantially vertical when the animal squats to defecate.

11. An animal feces collection system comprising:
    a wearable housing configured to be worn by an animal, the wearable housing comprising a body and a hole therein configured to allow animal feces to pass therethrough;
    a retainer ring removably connected to the wearable housing, the retainer ring comprising at least one bag clamp;
    a bag removably connected to and held open by the retainer ring via the at least one bag clamp; and
    a user device in communication with the wearable housing, the user device configured output a deposit signal to the wearable housing upon receiving a corresponding user command,
    wherein upon receiving the deposit signal, the wearable housing is configured to disconnect the retainer ring and bag, with feces therein, which is connected to the retainer ring.

12. The system of claim 11, wherein the user device comprises a remote controller that has a button which when depressed by the user causes the remote controller to send the deposit signal to the wearable housing.

13. The system of claim 11, wherein after being disconnected from the wearable housing, the retainer ring is configured to retain and hold the bag in its open position, allowing the user to pick up the retainer ring and bag with feces therein from the ground, remove the bag from the retainer ring, close the bag, and deposit the bag in a garbage bin.

14. The system of claim 11, wherein:
    the wearable housing further comprises a pair of locating channels that extend into an inner periphery of the hole in the body;
    the retainer ring fits within the hole of the wearable housing; and
    the retainer ring comprises a pair of lateral side protrusions that fit within the channels of the wearable housing to accordingly locate and orient the retainer ring when assembled to the wearable housing.

15. The system of claim 11, wherein the wearable housing further comprises at least one locking mechanism configured to selectively lock onto the retainer ring to hold the retainer ring onto the wearable housing.

16. The system of claim 15, wherein the locking mechanism comprises:
    at least one locking pin located at an inner periphery of the hole; and
    at least one actuator configured to move the at least one locking pin into and out of the hole such that the at least one locking pin selectively contacts and locks the retainer ring within the hole of the wearable housing.

17. The system of claim 16, wherein the wearable housing further comprises a controller configured to receive the deposit signal from the user device and accordingly actuate the at least one actuator to unlock the retainer ring from the wearable housing.

18. A method comprising:
    providing an animal feces collection system comprising a wearable housing configured to be worn by an animal, the wearable housing comprising a body, a hole therein configured to allow animal feces to pass therethrough, and at least one locking mechanism, a retainer ring removably connected to the wearable housing, the retainer ring comprising at least one bag clamp, a bag configured to collect feces therein, and a user device in communication with the wearable housing;

attaching the bag to the retainer ring by fitting a mouth of the bag around the retainer ring;

clamping onto the bag by the at least one bag clamp of the retainer ring;

inserting the retainer ring, and bag attached thereto, into the hole of the wearable housing;

locking the retainer ring within the hole of the wearable housing by the at least one locking mechanism;

attaching the wearable housing to the animal;

upon the animal defecating into the bag, inputting a user command into the user device;

sending, by the user device, a deposit signal to the wearable housing; and upon receiving the deposit signal, actuating the at least one locking mechanism to unlock the retainer ring, thus allowing the retainer ring, and bag with feces therein that is connected to retainer ring, to fall out of the ring holder and onto the ground.

* * * * *